United States Patent [19]

Walters et al.

[11] 4,102,691

[45] Jul. 25, 1978

[54] GELLABLE BINDERS

[75] Inventors: Ian Richard Walters, Huddersfield; Harold Garton Emblem, Mirfield, both of England

[73] Assignee: Zirconal Processes Limited, Bromley, England

[21] Appl. No.: 780,352

[22] Filed: Mar. 23, 1977

[30] Foreign Application Priority Data

Mar. 28, 1974 [GB] United Kingdom ..... 13834/74
Aug. 13, 1974 [GB] United Kingdom ..... 35610/74

Related U.S. Application Data

[63] Continuation-in-part of Ser. No. 561,347, Mar. 24, 1975, Pat. No. 4,025,350.

[51] Int. Cl.² .................................................. B28B 7/34
[52] U.S. Cl. ............................... 106/38.35; 106/383; 106/38.5 R; 106/57; 106/58; 106/65; 164/12; 264/63; 427/133; 427/204; 427/205; 427/343; 427/344

[58] Field of Search .............. 106/38.5 R, 38.2, 38.22, 106/38.3, 38.35, 57, 58, 65; 164/12; 264/63; 427/343, 256, 204, 205, 344, 133

[56] References Cited

U.S. PATENT DOCUMENTS

| 2,323,387 | 7/1943 | Edelstein | 427/343 |
| 3,232,771 | 2/1966 | Pearce | 106/38.35 |
| 3,607,319 | 9/1971 | Scott | 106/38.35 |
| 3,860,476 | 1/1975 | Moore | 427/204 |

*Primary Examiner*—Ronald H. Smith
*Assistant Examiner*—Janyce A. Bell
*Attorney, Agent, or Firm*—Christensen, O'Connor, Johnson & Kindness

[57] ABSTRACT

The present invention provides a method of producing a shaped object by coating a pattern with a slurry of a refractory powder in a binder. The binder comprises an acidic zirconium salt and also a gellation delaying agent. The slurry is caused to gell by contacting it with ammonia vapor.

6 Claims, No Drawings

GELLABLE BINDERS

The application is a continuation-in-part based on our Application Ser. No. 561,347 dated Mar. 24, 1975, now U.S. Pat. No. 4,025,350. The disclosure of this application is hereby incorporated by reference.

This invention relates to moulding techniques wherein a pattern is coated with a settable slurry. The pattern is usually expendable, for example made of wax.

In accordance with the present invention a method of producing a shaped refractory object comprises the steps of coating a shaped pattern with a slurry made by combining a refractory powder, an aqueous solution of a zirconium salt which when dissolved in water yields an aqueous solution which is acidic, and a gellation-delaying agent selected from the group consisting of magnesium acetate, magnesium lactate, ammonium lactate, glycine, betaine, fructose and polyhydric alcohols and thereafter contacting the slurry with ammonia vapour thereby causing the zirconium salt to gell.

The ammonia vapour is preferably ammonia gas but the use of a mist of liquid ammonia droplets is also envisaged, as is the use of a mist of an aqueous solution of ammonia. The preferred aqueous solution of ammonia has a specific gravity of about 0.91 corresponding to about 25% $NH_3$ and desirably has a specific gravity of about 0.88 corresponding to about 35% $NH_3$.

Preferably more than one coating step is performed each with a subsequent contacting with ammonia vapour. A further preference is that after each coating step but prior to the vapour contacting step the unset slurry should be dusted, i.e. lightly covered, with refractory granules.

In the preparation of moulds for coating metals or alloys according to the invention a monolithic ceramic shell mould may be prepared by applying several coatings to the expendable pattern, with coarse refractory material being dusted on to each wet coating. Each coating is hardened with ammonia before the next coating is applied. Usually six to eight coatings and dustings are suitable.

Alternatively, a solid block mould may be prepared by first applying only one coating to the expendable pattern, dusting coarse refractory material on to the wet coating and hardening the coating by the action of ammonia, then surrounding the coated pattern with a slurry of a powdered refractory material in a suitable binding agent. British Specification No. 753,228 gives a description of suitable refractory materials and binding agents. In general terms this Specification provides a method of forming a mould for precision casting of metal which includes adding an aqueous solution of sodium or potassium silicate or a mixture thereof to an excess of an aqueous solution of a mineral acid, mixing with the acid reaction products so formed a stable substantially electrolyte-free colloidal dispersion of silica in water and using the resultant liquid to bind a refractory mould material. The refractory materials envisaged are Silica, the aluminium silicates such as Mullite, Sillimanite, Calcined Kaolin and Calcined Fireclay Grog, together with Zircon and Zirconia.

The invention will now be described in the following Examples.

EXAMPLE I

Ceramic Shell Mould Production

A solution of magnesium acetate crystals ($4H_2O$) in zirconium acetate solution (containing zirconium corresponding to a $ZrO_2$ content of 22% nominal) can be used as follows in the preparation of ceramic shell moulds. A suitable solution contains 10 gms Magnesium acetate crystals ($4H_2O$) per 100 ml of zirconium acetate solution (containing zirconium corresponding to a $ZrO_2$ content of 22% nominal).

A slurry containing 200 grams of Molochite —120 grade per 100 ml of the magnesium acetate/zirconium acetate solution was prepared. This slurry was used to coat a wax pattern. Tabular alumina 28–48 grade was dusted on to the wet coating, which was hardened by exposure to ammonia vapour. This operation of dipping, dusting and exposure to ammonia vapour was repeated a further three times, giving a total of four dips and four dustings. The coatings were allowed to dry and harden overnight. When drying was complete a strong shell was obtained. To build up a large shell, more than four coatings will be required. A coarser grade of tabular alumina is desirable for dusting the later coatings.

An alternative procedure is to carry out two of the dipping, dusting and exposure to ammonia vapour sequences described above, then complete the forming of the ceramic shell mould by known methods using a slurry in which the binder is a silica aquasol or a hydrolysed ethyl silicate solution.

Molochite is a British Registered Trade Mark denoting a china clay calcination product. For a description of the preparation and properties see Claycraft, 1972, 45 (1), 10.

EXAMPLE II

Solid Block Mould Production

A solid block mould may be prepared by first applying only one coating to the expendable pattern, dusting coarse refractory material on to the wet coating and hardening the coating by the action of ammonia vapour, then surrounding the coated pattern with a slurry of a powdered refractory material in a suitable binding agent. British Specification No. 753,228 gives a description of suitable refractory materials and binding agents.

A suitable coating composition is a slurry containing 200 grams of Molochite —120 grade per 100 ml of a solution containing 10 grams of magnesium acetate ($4H_2O$) crystals per 100 ml of zirconium acetate solution (containing zirconium corresonding to a $ZrO_2$ content of 22% nominal). In some cases it may be advantageous to carry out two of the dipping, dusting and exposure to ammonia vapour sequences before surrounding the coated pattern with a slurry of a powdered refractory material in a suitable binding agent.

EXAMPLE III

Ceramic Shell Mould Production

Assembled wax patterns are first washed in industrial methylated spirit to remove dirt, release agents, etc. from the wax surface.

STAGE 1

The wax pattern assembly is dipped into coating Composition No. 1, then dusted with granular Zircon (Zircon Sand). The coating is now hardened by exposure to ammonia gas for 1 minute, then allowed to dry for 1 hour in air.

STAGE 2

The coated wax pattern assembly is dipped into coating Composition No. 2, then dusted with Molochite (30 and 80 grade). The coating is now hardened by exposure to ammonia gas for 1 minute, then allowed to dry for 1 hour in air.

STAGES 3, 4, 5 and 6

Each stage as Stage 2. An alternative procedure for stages 5 and 6 is to dust with Molochite −16 and 30.

For a large shell, more than 6 coats may be needed. Eight or more coats may be required.

STAGES 6A and 6B

As Stage 2 but dust with Molochite ( −16 and 80 grade). Harden by exposure to ammonia gas for 1 minute. Increase drying time to 2 hours if shell is large and complex.

STAGE 7

The coated wax pattern assembly is dipped into coating Composition No. 3 The coating is now hardened by exposure to ammonia gas for 1 minute. If desired the hardening by exposure to ammonia gas may be omitted. This is a sealing coat.

This completes the construction of the shell. The completed shell must be allowed to air-dry before dewaxing, firing and casting. An air-drying time of at least 24 hours is advised.

Coating Composition No. 1

600 grams of Zircon flour are dispersed in 200 ml of Zetabond 10. Zetabond 10 is a solution containing 10 grams of magnesium acetate ($4H_2O$) crystals per 100 ml of zirconium acetate solution (containing zirconium corresponding to a $ZrO_2$ content of 22% nominal).

Coating Composition No. 2

The refractory component is 90 parts by weight of Molochite (120 grade and 10 parts by weight of ball clay, grade TWVD, supplied by Watts, Blake, Bearne & Co. Ltd., The addition of the ball clay is most important.

The liquid component is one volume of Zetabond 10 diluted with one volume of water. The dilution made possible by the addition of the ball clay results in a considerable manufacturing economy.

To prepare the coating composition, 300 grams of the refractory component are dispersed in 200 ml of the liquid component.

Coating Composition No. 3

This is prepared from coating Composition No. 2

To 100 ml of coating Composition No. 2, add 50 ml water and 50 ml Zetabond 10.

The exposure to ammonia vapour should be effected by exposure to ammonia gas from a cylinder. Exposure to the fumes from 0.880 sp.gr. ammonia solution is unsatisfactory for large shells.

A suitable zirconium acetate solution for use in the procedure given in the example is described in Baco Chemicals data sheet No. 431 (British Aluminium Co. Ltd.). This solution contains zirconium corresponding to a $ZrO_2$ content of 27% nominal [$ZrO_2$ = 21 - 23% by weight].

We claim:

1. A method of producing a shaped refractory object comprising the steps of coating a shaped pattern with a slurry made by combining a refractory powder, an aqueous solution of a zirconium salt which when dissolved in water yields an aqueous solution which is acidic, and a gellation-delaying agent selected from the group consisting of magnesium acetate, magnesium lactate, ammonium lactate, glycine, betaine, fructose and polyhydric alcohols, contacting the slurry with ammonia vapour thereby causing the zirconium salt to gell, and thereafter drying the coating, removing the pattern, and firing the produced article.

2. A method as claimed in claim 1 wherein subsequent to the coating step but prior to the vapour contacting step the slurry is dusted with refractory granules.

3. A method as claimed in claim 2 wherein more than one coating step is performed each with a subsequent dusting with refractory granules and contacting with ammonia vapour.

4. A method as claimed in claim 2 wherein the granules are coarse granules and comprising the step of surrounding the coated pattern after the vapour contacting step with a slurry of powdered refractory material in a binding agent.

5. A method as claimed in claim 1 wherein the zirconium salt is zirconium acetate and wherein the gellation-delaying agent is magnesium acetate.

6. A method as claimed in claim 5 wherein the slurry is prepared by dispersing refractory particles in a solution containing approximately 10 gm Magnesium acetate crystals ($4H_2O$) per 100 ml of zirconium acetate solution containing zirconium corresponding to a $ZrO_2$ content of 22% nominal.

* * * * *